April 13, 1954      W. A. RAY      2,675,416
RADIATION THERMOCOUPLE
Filed Aug. 19, 1949
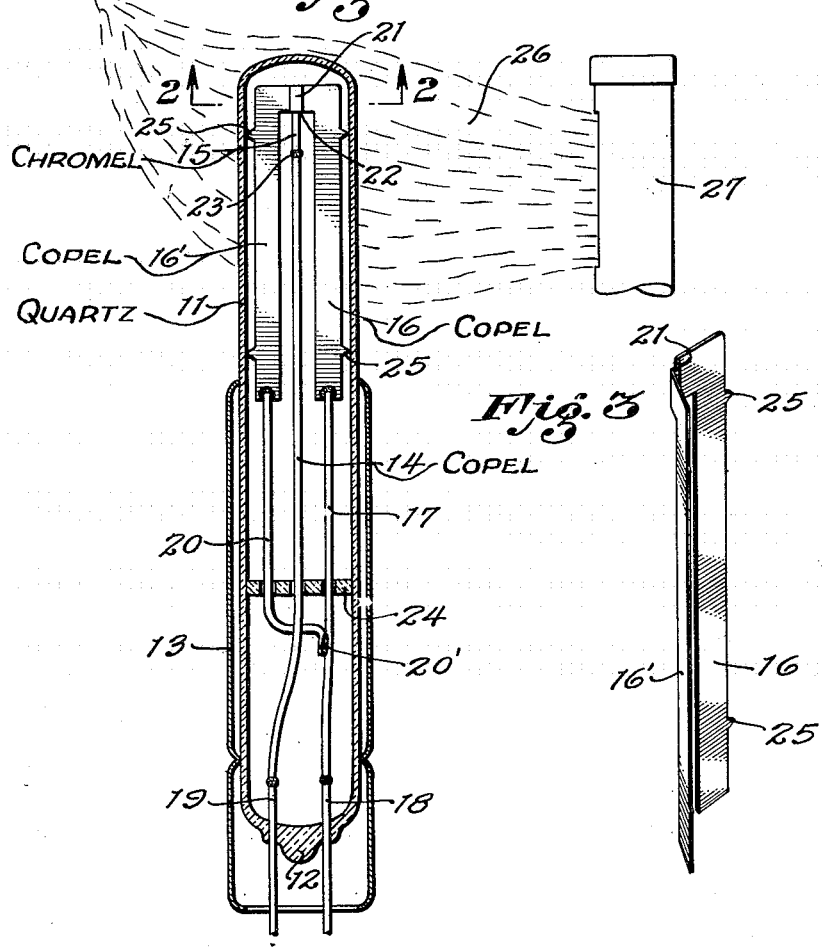
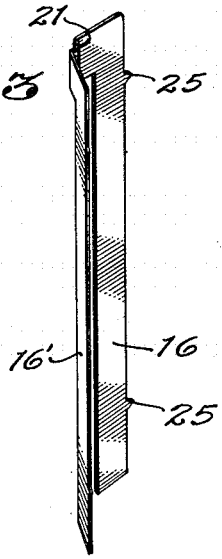
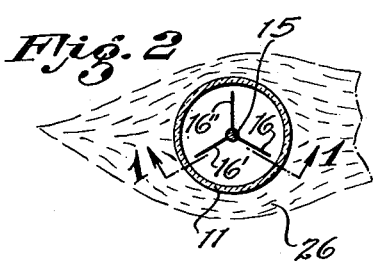
Inventor,
WILLIAM A. RAY
By John H. Rouse,
Attorney Patented Apr. 13, 1954

2,675,416

UNITED STATES PATENT OFFICE 2,675,416

RADIATION THERMOCOUPLE

William A. Ray, North Hollywood, Calif., assignor to General Controls Co., Glendale, Calif., a corporation of California Application August 19, 1949, Serial No. 111,197

4 Claims. (Cl. 136—4)

My present invention relates to thermoelectric generating devices; a main object of the invention being to provide a thermocouple structure adapted to be subjected directly to a flame and yet capable of responding very rapidly to the establishment and extinguishment of the flame.

The importance of high-speed operation of flame-responsive safety devices is now well recognized, especially in industry, and systems of the flame-conduction type, which depend on conduction of electricity by the ions of a flame, are employed in order to achieve the desired rapidity of response. However, such systems are not entirely satisfactory due to: (1) the fact that fluttering of the flame may cause false operation because of the ultra-rapid response of the system, so that time-delay means must be provided, (2) eventual deterioration of the electrodes subjected to the flame, which may result in erratic or unsafe operation, and (3) the fact that the current conducted through the flame is usually supplied from the A. C. service lines so that variation of the line voltage, when amplified in the system, may effect false operation.

By the use of a thermocouple structure according to the present invention a system can be provided which is free from the disadvantages, pointed out in the preceding paragraph, of a flame-conduction system and yet has sufficiently rapid response to meet most requirements.

The advantages of a flame-responsive control system according to this invention are inherent in the thermocouple structure—(1) whose operative response to flame failure is rapid (down to 1-2 seconds), but not so rapid as to necessitate use of time-delay means, (2) which is not subject to deterioration by long exposure to the flame, and (3) which generates its own source of steady D. C. so that the controlling energy is independent of conventional electric sources.

In my Patent No. 2,466,274 a thermocouple is described and claimed whose rapidity of response depends on the fact that its hot and its cold junction are close to each other and are exposed substantially equally to a flame or to the hot gases in a furnace; the required difference of temperature at the junctions being due mainly to the difference of mass of the thermocouple elements at and adjacent the junctions whereby the "cold junction" has a greater cooling effect on the hot gases than does the "hot junction" and therefore remains at a lower temperature.

The thermocouple of the present invention, while also having a similar arrangement of adjacent hot and cold junctions, differs from the thermocouple of said patent in that the elements of the thermocouple of this invention are arranged to be subjected substantially solely to thermal radiation. Thermal radiation can be appreciated only when absorbed by a body and then converted by it into heat. A body obviously cannot have a "cooling" effect on thermal radiation, as does a body upon flame or other hot gases to which it is exposed. Further, in a radiation thermocouple but little radiation can be absorbed by the junctions themselves, so that the temperature at the junctions depends mainly upon the heat conducted to them by the adjoining portions of the elements, the amount of which heat is determined by the radiation-absorbing area of those portions. In distinction, when the junctions of a thermocouple are in a flame or other hot gases, heat is conducted from the gases directly to the junctions themselves, and the thermoelectric effect is in no way influenced by the temperature of the portions of the elements between the junctions.

The teaching heretofore has been that a thermocouple of the radiation type must be remote from the source of heat. In distinction, I encase the thermocouple in an evacuated envelope of material such as quartz and subject the envelope directly to the flame. By this arrangement, radiation losses are minimized, and deterioration of the materials of the thermocouple is substantially eliminated, so that the materials can be selected from those having high thermoelectric powers but incapable of withstanding prolonged exposure to heated gases.

For full understanding of the invention, and further appreciation of its objects and advantages, reference is to be had to the following detailed description and accompanying drawing, and to the appended claims.

In the drawing:

Figure 1 is a longitudinal sectional view of a thermocouple structure embodying this invention, taken generally along the lines 1—1 of Fig. 2;

Figure 2 is a transverse section taken along the line 2—2 of Fig. 1; and

Figure 3 is a view in perspective, and to enlarged scale, of a part employed in the construction of the thermocouple shown in the other figures.

Referring now more particularly to the drawing, the numeral 11 indicates a tubular envelope which, after evacuation, is sealed-off at its bottom as indicated at 12. The envelope 11 is of material having good transmittancy of thermal radiation, such as quartz glass. Around the lower part of the envelope is a protective metal sleeve 13 which serves as means for mounting the thermocouple structure in a suitable fixture.

Within the upper part of the envelope is a thermocouple which comprises three serially-joined electric conductors: a long rod or wire 14 forming one end conductor, a short rod or wire 15 forming an intermediate conductor, and a thin sheet-metal conductor 16 forming the other end conductor. In the preferred embodiment of the invention as shown there are three of the conductors 16, indicated at 16, 16' and (seen only in Fig. 2) 16", each of inverted L-shape and joined at the ends of their short horizontal portions to the upper portion of the intermediate conductor or rod 15. For connecting the thermocouple to an external load, a wire 17 is welded to the bottom of conductor 16, this wire extending downwardly and being welded to a conventional terminal wire 18 which sealingly projects through the bottom wall of the envelope. The end conductor or wire 14 is joined directly to a similar terminal wire 19.

To reduce the electrical resistance of the thermocouple the sheet-metal conductors 16' and 16" are preferably connected in parallel with conductor 16; conductor 16' being shown so connected by a wire 20 welded to wire 17 at 20', but to avoid possible confusion no such wire is shown connecting conductor 16" since that conductor cannot be seen in Fig. 1.

The conductors 16, 16' and 16" are constructed from three inverted U-shaped pieces (one of which is shown per se in Fig. 3) whose side arms are at an angle of 120° as viewed from the top, the central part of the cross-arm of the U being curved as indicated at 21 to conform to a segment of the circumference of rod 15. The three pieces, each as shown in Fig. 3, are joined together, as by projection welding, to form the three-pointed assembly seen in Fig. 2, and then are welded by their portions 21 to the rod 15. The lower point of contact 22 between rod 15 and conductors 16, 16' and 16" forms one thermoelectric junction of the thermocouple, the other thermoelectric junction being at the weld 23 between rods 15 and 14. The sheet metal of which conductors 16, 16' and 16" are constructed is very thin; it being in a practical embodiment 0.002 inch thick so that the total thickness of each finished conductor was 0.004 inch. In the same embodiment the diameter of rods 14 and 15 (and of wires 17 and 20) was about 0.045 inch.

To support the thermocouple at its lower end there is a ceramic disk 24, closely fitting within the envelope, having openings for the wires or rods 14, 17 and 20. To maintain the conductors 16, 16' and 16" in substantially spaced relation to the wall of the envelope and thereby minimize transfer of heat therebetween, these conductors are provided with triangular projections 25 which can make only point-contact with the envelope.

In use, the upper part of the envelope is subjected directly to a flame 26 shown issuing from a vertical slot in a gas burner 27. By reason of the three-pointed or angular arrangement of the conductors 16, 16' and 16" (see Fig. 2), substantially the same surface area of these conductors is presented toward all sides of the envelope, so that no particular orientation of the structure in relation to the flame is necessary.

The intermediate conductor 15 is conveniently of an alloy containing approximately 90% Ni and 10% Cr (such as "Chromel"), and all of the other conductors 14, 16, 16' and 16" (as well as the extensions 17 and 20) of an alloy containing approximately 55% Cu and 45% Ni (such as "Copel"); the wires 18 and 19 being of the usual material suitable for sealing to quartz glass. While the particular alloys mentioned are those at present preferred, other materials may be substituted; the only requirement being that the intermediate conductor 15 be of material thermoelectrically dissimilar to those of the end conductors 14 and 16.

When the structure is subjected to a flame as shown in the drawing, a relatively large proportion of the thermal radiation produced by the flame is transmitted by the quartz envelope to the elements or conductors of the thermocouple. This radiation is absorbed by the conductors and converted into heat which passes to the thermoelectric junctions 22 and 23. Inasmuch as the area of the surfaces of the sheet-metal conductors 16, 16' and 16" exposed to the radiation is large in relation to that of the corresponding surfaces of the rod-like conductors 15 and 14, the amount of heat passing from the sheet-metal conductors and conductor 15 to the upper junction 22 is greater than that passing from conductors 15 and 14 to the lower junction 23 so that the temperature of junction 22 becomes higher than that of junction 23.

The difference of temperature at the junctions is constant while the flame exists since the end conductor 14 and the sheet-metal end conductors are connected to the exterior of the structure through like leads or wires 18 and 19 and the heat losses from the conductors by conduction through these leads is therefore the same. The envelope being evacuated, and the conductors all spaced from the envelope (except for possible point-contact of the projections 25), heat losses other than through the leads 18 and 19 is substantially only that due to reradiation.

The difference of temperature normally maintained at the junctions 22 and 23 is not great, but the electrical energy thereby generated is ample for control purposes, as when, for example, it is employed to "saturate" the reactor of a magnetic amplifier. In practical embodiments of the invention, of approximately the same size and construction as shown in the drawing, and as described, when the structure was subjected to an ordinary gas flame the total power output was of the order of 25 to 250 microwatts, which corresponds to an E. M. F. of about 1.5 to 10 millivolts when the total resistance of the thermocouple is 0.1 to 0.5 ohm.

When the flame is extinguished, equalization of the temperature of the junctions 22 and 23 occurs rapidly; the time being of the order of 1 to 5 seconds in the practical embodiments described. The rapidity of equalization of temperature (when the flame is extinguished) is due not only to the proximity of the junctions and the rapid uniform distribution of the heat stored in the portions of the conductors adjacent the junctions, but also to the large radiating surface and relatively small mass of the thin sheet-metal conductors joined to the "hot" junction 22, whereby the heat at that junction is quickly dissipated. A reasonably high degree of vacuum in the envelope, as well as substantial spacing of the conductors from the envelope, are essential to avoid conduction of heat to the thermocouple from the slowly-cooling envelope after the flame is extinguished, since such conduction of heat would greatly increase the time required for equalization of the temperature of the junctions.

The required difference of temperature of the junctions is quickly reached after the flame is lighted due to the large radiation-absorbing area of the sheet-metal conductors and to the thinness of the same. It is to be observed that in the practical embodiment described the surface area of the sheet-metal conductors subjected to radiation is several times (approximately six times) that of the corresponding surface of the rod-like conductors 14 and 15, while the total cross-sectional area (or mass per unit length) of the three sheet-metal conductors is only slightly in excess of the cross-sectional area of each of the conductors 14 and 15.

The specific embodiment of my invention herein shown and described is obviously susceptible of modification without departing from the spirit of the invention, and I intend therefore to be limited only by the scope of the appended claims.

I claim as my invention:

1. A thermocouple structure comprising: a tubular envelope of material having good transmittancy of thermal radiation and adapted to be subjected directly to a flame, said envelope being evacuated and sealed; and a thermocouple so mounted in said envelope as to minimize transfer of heat from the envelope to the thermocouple, said thermocouple comprising two end conductors and an intermediate conductor serially joined to form a pair of adjacent thermoelectric junctions, said thermoelectric junctions being so arranged that when the envelope is subjected to said flame the junctions are exposed substantially equally to thermal radiation from the flame, said intermediate conductor being of material thermoelectrically dissimilar to that of the end conductors, one of said end conductors being of thin sheet metal, the other of the conductors both being of rod-like form and thick in relation to said sheet metal, said sheet-metal conductor being elongated and arranged longitudinally of said tubular envelope, said rod-like conductors being coaligned and arranged longitudinally of the envelope in spaced and generally parallel relation to the sheet-metal conductor, the area of the surface of the sheet-metal conductor exposed to thermal radiation transmitted by the envelope being at least several times that of the corresponding surface of the intermediate and the other of the end conductors.

2. A thermocouple structure as defined in claim 1, and wherein the length of the intermediate rod-like conductor exposed to the thermal radiation is considerably less than the length of the other of the rod-like conductors so exposed.

3. A thermocouple structure comprising: a tubular envelope of material having good transmittancy of thermal radiation and adapted to be subjected directly to a flame, said envelope being evacuated and sealed; and a thermocouple so mounted in said envelope as to minimize transfer of heat from the envelope to the thermocouple, said thermocouple comprising two end conductors and an intermediate conductor serially joined to form a pair of adjacent thermoelectric junctions, said thermoelectric junctions being so arranged that when the envelope is subjected to said flame the junctions are exposed substantially equally to thermal radiation from the flame, said intermediate conductor being of material thermoelectrically dissimilar to that of the end conductors, one of said end conductors being formed by a plurality of elongated sheet-metal elements arranged longitudinally of said tubular envelope generally parallel to each other and electrically interconnected in parallel, the intermediate conductor and the other of the end conductors both being of rod-like form and thick in relation to said sheet metal, said rod-like conductors being coaligned and arranged longitudinally of the envelope in spaced and generally parallel relation to said sheet-metal elements, the area of the surfaces of the sheet-metal elements exposed to thermal radiation transmitted by the envelope being at least several times that of the corresponding surface of the intermediate and the other of the end conductors.

4. A thermocouple structure as defined in claim 1, and wherein said sheet-metal elements are so arranged as to present substantially the same area of surface toward all sides of the tubular envelope.

References Cited in the file of this patent

UNITED STATES PATENTS

| Number | Name | Date |
|---|---|---|
| 1,474,903 | Hase | Nov. 20, 1923 |
| 2,466,274 | Ray | Apr. 5, 1949 |

FOREIGN PATENTS

| Number | Country | Date |
|---|---|---|
| 706,670 | Germany | May 31, 1941 |

OTHER REFERENCES

Corning: Metals and Alloys, September 1944, page 715.